(12) United States Patent
Shah et al.

(10) Patent No.: US 12,327,169 B2
(45) Date of Patent: *Jun. 10, 2025

(54) CONTROLLING A ROBOT BASED ON FREE-FORM NATURAL LANGUAGE INPUT

(71) Applicant: GOOGLE LLC, Mountain View, CA (US)

(72) Inventors: Pararth Shah, Sunnyvale, CA (US); Dilek Hakkani-Tur, Los Altos, CA (US); Juliana Kew, San Francisco, CA (US); Marek Fiser, Mountain View, CA (US); Aleksandra Faust, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,159

(22) Filed: Mar. 11, 2024

(65) Prior Publication Data
US 2024/0249109 A1 Jul. 25, 2024

Related U.S. Application Data

(63) Continuation of application No. 17/040,299, filed as application No. PCT/US2019/023714 on Mar. 22, 2019, now Pat. No. 11,972,339.

(Continued)

(51) Int. Cl.
*G06N 3/008* (2023.01)
*B25J 9/16* (2006.01)
(Continued)

(52) U.S. Cl.
CPC .............. *G06N 3/008* (2013.01); *B25J 9/161* (2013.01); *B25J 9/162* (2013.01); *B25J 9/163* (2013.01);
(Continued)

(58) Field of Classification Search
CPC ......... G06V 20/10; B25J 11/00; B25J 19/023; B25J 9/163; H03H 21/0012;
(Continued)

(56) References Cited

U.S. PATENT DOCUMENTS 5,408,424 A * 4/1995 Lo ...................... H03H 21/0012
706/22
7,831,433 B1 11/2010 Belvin
(Continued)

FOREIGN PATENT DOCUMENTS

CN 101474481 7/2009
CN 102313547 1/2012
(Continued)

OTHER PUBLICATIONS

Peter Anderson: "Vision-and-Language Navigation: Interpreting visually-grounded navigation instructions in real environments." 1st submission: Mon, Nov. 20, 2017 (Year: 2017).*
(Continued)

*Primary Examiner* — Yuri Kan
(74) *Attorney, Agent, or Firm* — Gray Ice Higdon (57) ABSTRACT

Implementations relate to using deep reinforcement learning to train a model that can be utilized, at each of a plurality of time steps, to determine a corresponding robotic action for completing a robotic task. Implementations additionally or alternatively relate to utilization of such a model in controlling a robot. The robotic action determined at a given time step utilizing such a model can be based on: current sensor data associated with the robot for the given time step, and free-form natural language input provided by a user. The free-form natural language input can direct the robot to accomplish a particular task, optionally with reference to one or more intermediary steps for accomplishing the particular task. For example, the free-form natural language
(Continued)

input can direct the robot to navigate to a particular landmark, with reference to one or more intermediary landmarks to be encountered in navigating to the particular landmark.

19 Claims, 4 Drawing Sheets

Related U.S. Application Data (60) Provisional application No. 62/647,425, filed on Mar. 23, 2018.

(51) Int. Cl.
| | | |
|---|---|---|
| B25J 13/08 | (2006.01) | |
| G05B 13/02 | (2006.01) | |
| G05D 1/00 | (2024.01) | |
| G05D 1/02 | (2020.01) | |
| G06F 18/21 | (2023.01) | |
| G06N 3/044 | (2023.01) | |
| G06N 3/08 | (2023.01) | |
| G06T 7/593 | (2017.01) | |
| G06V 20/10 | (2022.01) | |
| G06V 30/262 | (2022.01) | |
| G10L 15/16 | (2006.01) | |
| G10L 15/18 | (2013.01) | |
| G10L 15/22 | (2006.01) | |
| G10L 25/78 | (2013.01) | |

(52) U.S. Cl.
CPC .............. *B25J 9/1697* (2013.01); *B25J 13/08* (2013.01); *G05B 13/027* (2013.01); *G05D 1/0221* (2013.01); *G06F 18/21* (2023.01); *G06N 3/044* (2023.01); *G06N 3/08* (2013.01); *G06T 7/593* (2017.01); *G06V 20/10* (2022.01); *G06V 30/274* (2022.01); *G10L 15/16* (2013.01); *G10L 15/1815* (2013.01); *G10L 15/22* (2013.01); *G10L 25/78* (2013.01); *G10L 2015/223* (2013.01)

(58) Field of Classification Search
CPC ...... B60N 2/2863; G06N 3/008; G10L 15/22; G05B 19/0426; G06F 8/34; G06F 16/5854; G06F 3/0233; B60W 50/14; B60W 30/182; H04W 24/02

See application file for complete search history.

(56) References Cited

U.S. PATENT DOCUMENTS

| | | | | |
|---|---|---|---|---|
| 9,104,271 | B1* | 8/2015 | Adams ................. | G06F 3/0233 |
| 10,372,130 | B1* | 8/2019 | Kaushansky ......... | B60W 50/14 |
| 10,761,542 | B1* | 9/2020 | Fairfield ............. | B60W 30/182 |
| 2002/0038168 | A1* | 3/2002 | Kasuga .................... | G06F 8/34 |
| | | | | 700/250 |
| 2003/0023347 | A1* | 1/2003 | Konno ............... | G05B 19/0426 |
| | | | | 700/245 |
| 2004/0233290 | A1* | 11/2004 | Ohashi .................. | B25J 19/023 |
| | | | | 348/E13.016 |
| 2005/0043956 | A1* | 2/2005 | Aoyama ................. | G10L 15/22 |
| | | | | 704/E15.04 |
| 2006/0047362 | A1* | 3/2006 | Aoyama ................. | G10L 15/22 |
| | | | | 704/E15.04 |
| 2006/0184273 | A1* | 8/2006 | Sawada .................. | G06N 3/008 |
| | | | | 700/245 |
| 2009/0030605 | A1* | 1/2009 | Breed .................. | B60N 2/2863 |
| | | | | 340/901 |
| 2014/0349630 | A1* | 11/2014 | Hyde ................... | H04W 24/02 |
| | | | | 455/418 |
| 2018/0060666 | A1 | 3/2018 | Song | |
| 2019/0384312 | A1* | 12/2019 | Herbach ............. | G06F 16/5854 |
| 2021/0086353 | A1 | 3/2021 | Shah | |

FOREIGN PATENT DOCUMENTS

| | | | | |
|---|---|---|---|---|
| CN | 106027300 | 10/2016 | | |
| CN | 106683667 | 5/2017 | | |
| CN | 106970815 | 7/2017 | | |
| CN | 107063258 | 8/2017 | | |
| KR | 100752098 | 8/2007 | | |
| RU | 2413304 | 2/2011 | | |
| WO | 03019452 | 3/2003 | | |
| WO | 2004080665 | 9/2004 | | |
| WO | 2018012645 | 1/2018 | | |
| WO | WO-2018012645 A1 * | 1/2018 | .............. | B25J 11/00 |
| WO | 2019183568 | 9/2019 | | |

OTHER PUBLICATIONS

European Patent Office; Communication pursuant to Article 94(3) issued in Application No. 19715772.0; 7 pages; dated Mar. 13, 2024.

China National Intellectual Property Administration; Office Action issued in Application No. 201980031823.1; 39 pages; dated Jan. 15, 2024.

European Patent Office; International Search Report and Written Opinion of PCT Ser. No. PCT/2019/023714; 22 pages; dated Jun. 24, 2019.

Anderson, P. et al. "Vision-and-Language Navigation: Interpreting visually-grounded navigation instructions in real environments"; retrieved from internet: URL:https/arxiv.org/pdf/1711.07280v2.pdf [retrieved on Jun. 12, 2019]; 13 pages; Nov. 24, 2017.

Bahdanau, D. et al. "Neural Machine Translation by Jointly Learning to Align and Translate"; Retrieved from internet: URL:https://arxiv.org/pdf/1409.0473.pdf [retrieved on Aug. 18, 2017]; 15 pages; May 19, 2016.

Shah, P. et al. "FollowNet: Robot Navigation by Following Natural Language Directions with Deep Reinforcement Learning"; arxiv.org, Cornell University Library; 7 pages; May 16, 2018.

China National Intellectual Property Administration; Notice to Grant issued in Application No. 201980031823.1; 5 pages; dated Sep. 29, 2024.

Gavrilut, I. et al.; Vision Based Algorithm for Path Planning of a Mobile Robot by Using Cellular Neural Networks; IEEE; 12 pages; dated 2006.

China National Intellectual Property Administration; Second Office Action issued in Application No. 201980031823.1; 10 pages; dated Jul. 22, 2024.

* cited by examiner

CONTROLLING A ROBOT BASED ON FREE-FORM NATURAL LANGUAGE INPUT

BACKGROUND

Many robots are programmed to perform certain tasks. For example, a robot on an assembly line can be programmed to recognize certain objects, and perform particular manipulations to those certain objects.

Further, some robots can perform certain tasks in response to explicit user interface input that corresponds to the certain task. For example, a vacuuming robot can perform a general vacuuming task in response to a spoken utterance of "robot, clean". However, typically, user interface inputs that cause a robot to perform a certain task must be mapped explicitly to the task. Accordingly, a robot can be unable to perform certain tasks in response to various free-form natural language inputs of a user attempting to control the robot. For example, a robot may be unable to navigate to a goal location based on free-form natural language input provided by a user. For instance, a robot can be unable to navigate to a particular location in response to a user request of "go out the door, turn left, and go through the door at the end of the hallway."

SUMMARY

Implementations disclosed herein utilize deep reinforcement learning to train a model (e.g., a deep neural network model) that can be utilized, at each of a plurality of time steps, to determine a corresponding robotic action for completing a robotic task. Implementations additionally or alternatively relate to utilization of such a model in controlling a robot. The robotic action determined at a given time step utilizing such a model can be based on: current sensor data associated with the robot for the given time step, and free-form natural language input provided by a user. The current sensor data associated with the robot can include, for example, a current instance of vision data generated based on output from one or more vision sensors of a vision component of a robot, where the current instance of vision data captures at least part of an environment of the robot. The free-form natural language input provided by the user can, for example, direct the robot to accomplish a particular task, optionally with reference to one or more intermediary steps for accomplishing the particular task (and optionally with reference to only the intermediary step(s)). For example, the free-form natural language input can direct the robot to navigate to a particular landmark, with reference to one or more intermediary landmarks to be encountered in navigating to the particular landmark.

In some implementations, one or more state branches of the model are utilized to process the current sensor data for a given time step and generate one or more state representations (e.g., an embedding) for the given time step. For example, an instance of vision data can be processed using one or more vision branches to generate at least one vision embedding for the given time step. Further, a natural language branch of the model is utilized to process the free-form natural language input to generate a natural language representation. The natural language representation for the given time step can optionally be based on attention weighting, during the processing, that is based on one or more of the state representations for the given time step. Yet further, the natural language representation and the state representation(s) can be processed over a policy network of the model to determine a robotic action to be implemented for the given time step. As mentioned above, deep reinforcement learning can be utilized to train the policy network, and optionally to jointly train the state representations and at least part of the natural language branch (e.g., the attention function). In these and other manners, the trained model can enable a corresponding robotic action to be determined and implemented at each of a plurality of time steps, based on the current state associated with the robot for the time step, and based on free-form natural language input provided by the user. Through implementations of the robotic actions of multiple time steps, the robot can accomplish the task indicated by the free-form natural language input. The trained model can selectively focus on the parts of the natural language input relevant to the current visual context when generating an action prediction output, which can result in an increase in a success rate of a robot in following natural language instructions.

In some implementations, a method implemented by one or more processors is provided and includes receiving an instance of vision data. The instance of vision data is generated based on output from one or more vision sensors of a vision component of a robot, and captures at least part of an environment of the robot. The method further includes generating at least one vision embedding based on processing the instance of vision data using at least one vision branch of a neural network model. The method further includes receiving free-form natural language input that is generated based on user interface input provided by a user via one or more user interface input devices. The method further includes generating a natural language embedding based on processing the free-form natural language input using a language branch of the neural network model. The method further includes generating an action prediction output based on processing of the at least one vision embedding and the natural language embedding using action prediction layers of the neural network model. The generated action prediction output indicates a robotic action to be performed based on the instance of vision data and the free-form natural language input. The method further includes controlling one or more actuators of a robot based on the action prediction output, wherein controlling the one or more actuators of the robot causes the robot to perform the robotic action indicated by the action prediction output.

These and other implementations can include one or more of the following features.

In some implementations, the language branch of the neural network model includes a memory network (e.g., a bi-directional memory network), and an attention layer. In some of those implementations generating the natural language embedding based on processing the free-form natural language input using the language branch of the neural network model includes: generating a bi-directional memory network output based on processing the free-form natural language input using the bi-directional memory network; generating an attention weighted bi-directional memory network output based on processing the bi-directional memory network output using an attention layer conditioned at least in part on the at least one vision embedding; and generating the natural language embedding based on further processing of the attention weighted bi-directional memory network output. In some versions of those implementations, generating the natural language embedding based on further processing of the attention weighted bi-directional memory network output includes generating the natural language embedding based on processing the attention weighted bi-directional memory network output over at least one additional feedforward layer of the language branch of the neural network model. In some additional or alternative versions, the attention layer is further conditioned on hidden states of forward and backward nodes of the bi-directional memory network after processing the free-form natural language input using the bi-directional memory network. The bi-directional memory network output can be, for example, a concatenation of the forward and backward nodes of the bi-directional memory network after processing the free-form natural language input using the bi-directional memory network.

In some implementations, generating at least one vision embedding based on processing the instance of vision data using the at least one vision branch of the neural network model includes: generating a depth embedding of the at least one vision embedding and generating a semantic embedding of the at least one vision embedding. Generating the depth embedding can be based on processing depth data of the instance of vision data using a depth vision branch of the at least one vision branch and generating the semantic embedding can be based on processing semantic data of the instance of vision data using a semantic vision branch of the at least one vision branch. In some of those implementations, the depth data includes, for each of a plurality of groups of pixels or voxels, a corresponding depth measure; and the semantic data includes, for each of the plurality of groups of pixels or voxels, a corresponding semantic identifier. Each of the plurality of groups of pixels or voxels can include only a corresponding single one of the pixels or voxels—or can include a plurality of pixels or voxels, such as two or more neighboring pixels or voxels. In some implementations, the semantic data of the instance of vision data can be generated based on a separate classification model that classifies each of a plurality of portions of an image into one or more corresponding semantic classes (e.g., only a single corresponding class for each portion).

In some implementations, the vision component of the robot is a stereographic camera or a light detection and ranging (LIDAR) component.

In some implementations, controlling the one or more actuators of the robot includes: selecting a next occupancy cell for the robot, from a plurality of candidate next occupancy cells bordering a current occupancy cell for the robot, based on the robotic action; and controlling the one or more actuators to cause the robot to move to the selected next occupancy cell.

In some implementations, the robotic action indicates locomotion for the robot in a direction, and controlling the one or more actuators of the robot causes locomotion of the robot in the direction indicated by the robotic action.

In some implementations, the action prediction output includes a value corresponding to the robotic action, and a plurality of additional values corresponding to additional candidate robotic actions. In some of those implementations, the action prediction output indicates the robotic action based on the value, corresponding to the robotic action, satisfying a threshold. In some versions of those implementations, at least one of the additional candidate robotic actions indicates a first change in orientation of the robot, and the robotic action indicates a second change in orientation of the robot or forward locomotion for the robot without a change in orientation. In some of those versions, when the robotic action indicates the second change in orientation, controlling the one or more actuators of the robot includes controlling the one or more actuators to cause the second change in orientation, without causing the robot to move from a current occupancy cell for the robot. Further, in some of those versions, when the robotic action indicates the forward locomotion for the robot, controlling the one or more actuators of the robot comprises controlling the one or more actuators to cause the robot to move from a current occupancy cell for the robot to an adjacent occupancy cell for the robot.

In some implementations, the free-form natural language input is generated based on a spoken utterance provided by the user and detected via a microphone of the robot.

In some implementations, the free-form natural language input is generated based on speech-to-text processing of audio data that corresponds to the detection of the spoken utterance via the microphone of the robot.

In some implementations, the method further includes, after controlling one or more actuators of a robot based on the action prediction output: receiving an additional instance of vision data, the additional instance of vision data generated based on additional output from one or more vision sensors of a vision component of a robot; generating at least one additional vision embedding based on processing the additional instance of vision data using the at least one vision branch of the neural network model; generating an additional natural language embedding based on processing the free-form natural language input using the language branch of the neural network model, and based on attention weighting, during the processing, that is based on the additional vision embedding; generating an additional action prediction output based on processing of the at least one additional vision embedding and the additional natural language embedding using the action prediction layers of the neural network model, wherein the additional action prediction output indicates an additional robotic action to be performed based on the additional instance of vision data and the free-form natural language input; and controlling the one or more actuators of the robot based on the additional action prediction output, wherein controlling the one or more actuators of the robot causes the robot to perform the additional robotic action indicated by the additional action prediction output.

In some implementations, a method implemented by one or more processors is provided and includes receiving free-form natural language input generated based on user interface input provided by a user via one or more user interface input devices. The method further includes generating a memory network output based on processing the free-form natural language input using a memory network. The method further includes, for each of a plurality of iterations: receiving a corresponding instance of vision data, the corresponding instance of vision data generated based on corresponding output from one or more vision sensors of a vision component of a robot for the iteration; generating at least one corresponding vision embedding based on processing the corresponding instance of vision data using at least one vision branch comprising a plurality of convolutional neural network layers; generating a corresponding natural language embedding based on processing the memory network output using an attention layer conditioned at least in part on the corresponding vision embedding; generating a corresponding action prediction output based on processing of the at least one corresponding vision embedding and the corresponding natural language embedding using a plurality of feedforward layers, wherein the corresponding action prediction output indicates a corresponding robotic action, of a plurality of candidate robot actions, to be performed based on the corresponding instance of vision data and the free-form natural language input; and controlling one or more actuators of a robot based on the corresponding action prediction output, wherein controlling the one or more actuators of the robot causes the robot to perform the corresponding robotic action indicated by the corresponding action prediction output.

In some implementations, a method implemented by one or more processors is provided and includes identifying free-form natural language that describes navigation to a goal location, and generating a memory network output based on processing the free-form natural language input using a memory network. The method further includes, for each of a plurality of iterations: receiving a corresponding instance of simulated or real vision data; generating at least one corresponding vision embedding based on processing the corresponding instance of simulated or real vision data using at least one vision branch comprising a plurality of convolutional neural network layers; generating a corresponding natural language embedding based on processing the memory network output using an attention layer conditioned at least in part on the corresponding vision embedding; generating a corresponding action prediction output based on processing of the at least one corresponding vision embedding and the corresponding natural language embedding using a plurality of feedforward layers that approximate an action-value function, wherein the corresponding action prediction output indicates a corresponding robotic action, of a plurality of candidate robot actions, to be performed based on the corresponding instance of vision data and the free-form natural language input; controlling a real or simulated robot based on the corresponding action prediction output; determining whether controlling the real or simulated robot based on the corresponding action prediction output caused the real or simulated robot to reach the goal location; and when it is determined that controlling the real or simulated robot based on the corresponding action prediction output caused the real or simulated robot to reach the goal location: using a reward, that corresponds to reaching the goal location, in updating at least the feedforward layers that approximate the action value function, wherein updating at least the feedforward layers is based.

In some of those implementations, the method further includes: identifying at least one intermediate location to be encountered in the navigation to the goal location and, for each of the plurality of iterations: determining whether controlling the real or simulated robot based on the corresponding action prediction output caused the real or simulated robot to reach the at least one intermediate location; and when it is determined that controlling the real or simulated robot based on the corresponding action prediction output caused the real or simulated robot to reach the at least one intermediate location: using an intermediate reward, that corresponds to reaching the at least one intermediate location, in updating at least the feedforward layers that approximate the action value function, wherein the intermediate reward is reduced relative to the reward.

In some implementations, a method implemented by one or more processors is provided and includes receiving an instance of robot sensor data generated based on output from one or more sensors of a robot, and capturing at least part of an environment of the robot. The method further includes generating at least one robot state embedding based on processing the instance of robot sensor data using a state branch of a neural network model. The method further includes receiving free-form natural language input generated based on user interface input provided by a user via one or more user interface input devices. The method further includes generating a natural language embedding based on processing the free-form natural language input using a language branch of the neural network model. The method further includes generating an action prediction output based on processing of the at least one vision embedding and the natural language embedding using action prediction layers of the neural network model. The action prediction output indicates a robotic action to be performed based on the instance of robot sensor data and the free-form natural language input. The method further includes controlling one or more actuators of a robot based on the action prediction output.

Other implementations may include a non-transitory computer readable storage medium storing instructions executable by one or more processors (e.g., one or more central processing units (CPUs). one or more graphics processing units (GPUs), and/or one or more tensor processing units (TPUs)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Various implementations are disclosed below that are related to training and/or utilizing a neural network model that can be utilized, at each of a plurality of time steps, to determine a corresponding robotic action for completing a robotic task. The robotic action determined at a given time step utilizing such a model can be based on: current sensor data associated with the robot for the given time step, and free-form natural language input provided by a user. Although particular examples are described below with respect to current sensor data that is vision data (e.g., depth data and/or vision data), it is understood that in some implementations additional and/or alternative sensor data can be utilized, such as radar data, sensor data from sensors corresponding to actuator(s) of the robot (e.g., force sensors, torque sensors), etc. For example, the depth vision branch and/or the semantic vision branch described below can be replaced or supplemented with branch(es) that process alternative sensor data such as radar data, force sensor data, etc.

Implementations disclosed herein utilize natural language input, such as free-form natural language input that is generated based on user interface input provided by a user via a user interface input device. As used herein, free-form natural language input includes natural language input that is based on a spoken utterance of a user, typing by a user, or other input(s) of a user that are not constrained to a restricted group of options presented for selection by the user (e.g., not constrained to a group of options presented in a drop-down menu). An instance of free-form natural language input can be based on user inputs via one or more user interface input devices of a robot being controlled, or can be received based on user inputs via one or more user interface input devices of a separate component (e.g., a smartphone, a tablet, a standalone assistant speaker, and/or other client computing device) that is in network communication with the robot. For example, a free-form natural language input can be based on a spoken utterance of a user. For instance, the free-form natural language input can be generated based on processing of audio data (e.g., speech-to-text processing), where the audio data is generated based on signals received from microphone(s) of a robot and/or of a separate component. In some of those instances, the processing of the audio data may optionally occur only after a user has explicitly requested such processing, such as by speaking a certain invocation phrase (e.g., "Hey robot") and/or actuating a hardware button, selecting a graphical interface element, and/or other particular user interface input.

In some implementations, a memory network is included in the neural network model. For example, a language branch of the neural network model can include a memory network for initially processing free-form natural language input. A memory network includes one or more memory layers each including a plurality of memory units. A memory unit can be, for example, a long short-term memory ("LSTM") memory unit, a gated recurrent unit ("GRU"), or other memory unit. In many implementations, the memory network can be a bi-directional memory network. Generating features utilizing a memory network can capture long term dependencies in natural language. In some implementations, various features generated using a memory network can be utilized in generating a natural language embedding based on a natural language input. Such features include, for example, a final forward state, a final backward state, and/or hidden states of nodes of a bi-directional memory network after processing of the natural language input. For example, and as described herein, a natural language embedding can be generated based on the final forward and backward states, and based on an attention function (e.g., represented by a trained attention layer) that is based on the hidden states and that is based on vision embedding(s) (and/or other embedding(s) based on sensor data that indicates the state of the robot). By utilizing the attention function that is based on the vision embedding(s) and/or other sensor embedding(s), the natural language embedding will change at each of one or more steps of controlling the robot based on a corresponding instance of natural language input. In other words, even though the natural language input remains the same and the outputs of the memory layer (that process the natural language input) remains the same in controlling the robot based on the natural language input, the natural language embedding nonetheless changes during the control as a result of the attention function that is based on vision embedding(s) and/or other sensor embedding(s). Accordingly, through training of an attention layer (that represents the attention function) as described herein, the natural language embedding may, at a given time step, bias toward term(s) that correspond to object(s) and/or action(s) that are represented by corresponding vision data for that time step.

Implementations of the neural network model disclosed herein can be considered a policy network that is utilized to control a robot. The observation space of the policy network includes natural language input and robot sensor input (e.g., visual and depth observations) from the robot's vantage point. The policy's output at each step is the next motion primitive to perform (e.g., rotate right, rotate right, move forward, and/or other motion primitive). The neural network model includes, in its language branch, a language attention mechanism that is conditioned on the robot's sensory observations. The language attention mechanism enables keeping track of the instructions of the natural language input, and focuses on different parts of the natural language input as the robot explores the environment. Moreover, the language attention mechanism associates motion primitives, sensory observations, and sections of the natural language input with the reward(s) received during training, which enables generalization to new instructions.

Prior to turning to the Figures, one particular implementation is described in detail. In the particular implementation, the robot can be assumed to be a point-mass with three degrees of freedom (x, y, θ) navigating in a 2-dimensional grid overlaid on a 3-dimensional indoor environment. However, other implementations can be configured and trained for a robot with more degrees of freedom that can navigate in 3 or more dimensional grids. For example, other implementations can increase the action space to additionally capture action(s) along additional degrees of freedom.

In training the neural network model (that represents the policy) in the particular implementation, the task can be formulated as a Partially Observable Markov Decision Process (POMDP): a tuple (O, A, D, R) with observations o=[$o_{NL}o_V$]∈ O, where $o_{NL}$=[ $w_1$ $w_2$ . . . $w_n$] is a natural language instruction sampled from a set of user-provided directions for reaching a goal. The location of the goal is unknown to the agent. $o_V$ is the visual input available to the agent, which includes the image that the robot sees at a time-step i. The set of actions, $$A = \left\{ \text{turn}\frac{\pi}{2}, \text{go straight}, \text{turn}\frac{3\pi}{2} \right\},$$

enables the robot to either turn in place or move forward by a step. The system dynamics, D: O×A→O, are deterministic and apply the action to the robot. The robot either transitions to the next grid cell or changes its orientation. Note, that the agent does not know where it is located in the environment.

The reward R: O→ ℝ rewards an agent reaching a landmark (waypoint) mentioned in the instruction, with a strong reward (e.g., +1.0) if the waypoint is the final goal location, and a smaller reward (e.g., +0.05) for intermediate waypoints. The agent is rewarded only once for each waypoint in the instruction it reaches, and the episode terminates when the agent reaches the final waypoint, or after a maximum number of steps.

The aim during training in the particular implementation is to learn an action-value function Q:O→ $\mathbb{R}^{\|A\|}$ approximated with a deep neural network and trained with DQN. The neural network model allows for approximating the action value function directly from the language and visual inputs. To simplify the image processing task, a separate preprocessing step can parse the visual input $o_V$∈ $\mathbb{R}^{n\times m}$ to obtain a semantic segmentation $o_S$ and a depth map $o_D$. The semantic segmentation $o_S$ can, for example, assign a one-hot semantic class id to each pixel. The depth map $o_D$ can, for example, assign a real number to each pixel corresponding to the distance from the robot.

The agent takes the ground truth $o_S$ and $o_D$ from its current point of view and runs each through a stack of convolutional layers followed by a fully-connected layer. From these it obtains fixed length embedding vectors $v_S \in \mathbb{R}^{ds}$ and $v_D \in \mathbb{R}^{dD}$ (where $d_x = \text{length}(v_x)$) that encode the visual information available to the agent.

A single layer bi-directional GRU network is utilized with state size $d_L$ and initial state set to 0, to encode the natural language instruction using the following equations: $h_F$, $\{O_{i,F}\} = GRU_F(\{w_i\})$; $h_B$, $\{O_{i,B}\} = GRU_B(\{w_i\})$; $o_i = [o_{i,F} O_{i,B}]$; $h_F$, $h_B m \in \mathbb{R}^{2dL}$; $o_i \in \mathbb{R}^{2dL}$, where $h_F$, $h_B m \in \mathbb{R}^{dL}$ are the final hidden states of the forward and backward GRU cells, respectively, while $o_i \in \mathbb{R}^{2dL}$ are the concatenated outputs of the forward and backward cells, corresponding to the embedded representation of each token conditioned on the entire utterance. To enable the agent to focus on different parts of the instruction depending on the context, a feed-forward attention layer is added over $o_i$:

$$v_C = [v_S v_D h_B h_F]$$
$$e_i = FF_A(v_C, o_i)$$
$$a_i = \text{softmax}(e_i)$$
$$a_i = a_i o_i$$
$$v_A = (1/k) \sum_i^k ai$$
$$v_L = FF_L(v_A)$$
$$Q(o) = FF_Q[v_S, v_D v_L])$$

A feed-forward attention layer $FF_A$ is utilized that is conditioned on $v_c$, where $v_c$ is the concatenated embeddings of the visual and language inputs, to obtain unnormalized scores $e_i$ for each token $w_i$. The unnormalized scores $e_i$ are normalized using the softmax function to obtain the attention scores $a_i$, which correspond to the relative importance of each token of the instruction for the current time step. The attention-weighted mean of the output vectors $o_i$ are passed through another feed-forward layer to obtain $v_L \in \mathbb{R}^{dL}$, which is the final encoding of the natural language instruction. The Q function is then estimated from the concatenated $[v_S v_D v_L]$ passed through a final feed-forward layer. During training, actions are sampled from the Q-function using an epsilon-greedy policy to collect experience, and update the Q-network to minimize the Bellman error over batches of transitions using gradient descent. After the Q function is trained, the greedy policy $\pi(o): O \rightarrow A$ is utilized, with respect to learned $\hat{Q}, \pi(o) = \pi \hat{Q}(o) = \text{argmax}_{a \in A} \hat{Q}(o,a)$, to take the robot to the goal presented in the instruction $o_l$.

Figure 1:
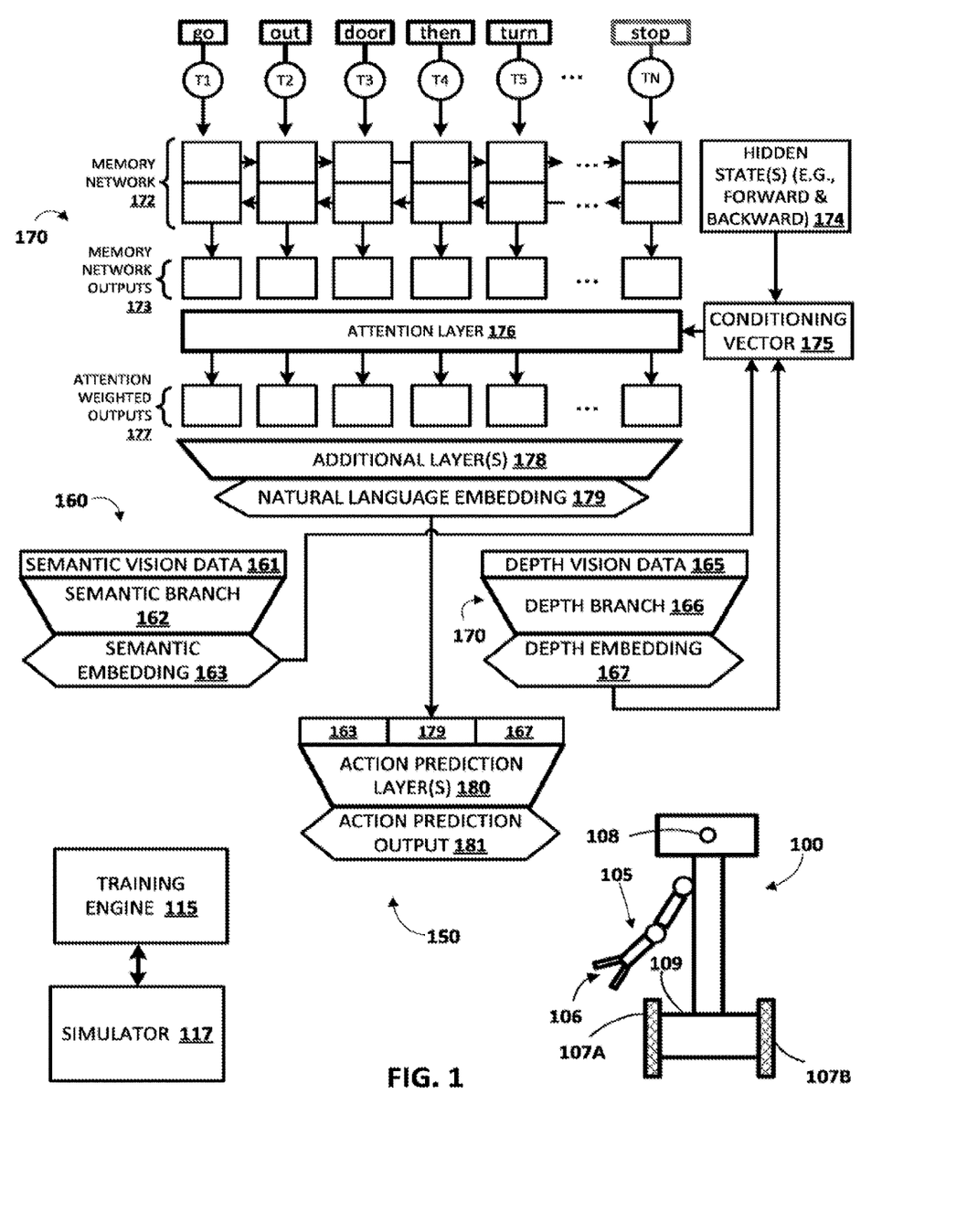
FIG. 1 illustrates an example environment in which implementations disclosed herein can be implemented.

Turning now to FIG. 1, an example environment is illustrated in which implementations disclosed herein can be implemented. FIG. 1 includes a neural network model 150 that includes a vision branch 160 that includes a semantic branch 162 and a depth branch 166. The semantic branch 162 is used to process instances of semantic vision data 161 to generate corresponding semantic embeddings 163.

The semantic vision data 161 can be, for example, an indication of one or more corresponding semantic identifiers (and optionally corresponding probabilities where multiple semantic identifiers are included for a corresponding group) for each of a plurality of corresponding groups of pixels or voxels. For example, semantic vision data 161 can be a corresponding semantic label (e.g., classification) for each of a plurality of pixels. In such an example, the groups of pixels or voxels each include only a single corresponding pixel, and the semantic vision data has only a single corresponding semantic label. The semantic labels can include a large variety of classification labels such as, for example, labels of: "door", "floor", "couch", "chair", "plant", "wall", "light switch", "unknown", etc. It is understood that, in the semantic vision data, the directly human interpretable natural language labels themselves could be used or, instead, non-directly human interpretable labels (e.g., "85A1" or identifier could be used instead of "door"). In other implementations, each group can optionally include multiple semantic identifiers, optionally with a probability for each of the multiple semantic identifiers. For instance, a group of pixel(s) that captures a green plant can include a "plant" label and a "green" label. As another example, semantic vision data can be a corresponding semantic label for each of a plurality of multi-pixel groupings and, in such an example, the group of pixels or voxels each include multiple corresponding pixels.

The semantic vision data 161 can be generated for example, by processing of vision data utilizing one or more classification networks (not illustrated) and assigning the semantic labels to the semantic vision data 161 based on the output generated by the processing. As one non-limiting example, the vision data can be processed using a trained faster-R-RNN model to generate a plurality of bounding boxes and corresponding classifications. The bounding boxes and classifications can then be used to assign corresponding classification labels to corresponding pixels (encompassed by the corresponding bounding boxes). The vision data that is processed to generate the semantic vision data can include, for example, a 2D RGB image, a 2.5D RGBD image, and/or a 3D point cloud.

The depth branch 166 is used to process instances of depth vision data 165 to generate corresponding depth embeddings 167. The depth vision data 165 includes a corresponding depth value for each of a plurality of corresponding groups of pixels or voxels. For example, depth vision data can be a corresponding depth value for each of a plurality of pixels. In such an example, the groups of pixels or voxels each include only a single corresponding pixel. In other implementations, depth vision data can be a corresponding depth value for each of a plurality of multi-pixel groupings and, in such an example, the group of pixels or voxels each include multiple corresponding pixels. The depth vision data 165 can be generated for example, by using depth values from a 2.5D RGBD image and/or a 3D point cloud. The resolution of the depth vision data 165 and the semantic vision data 161 can be the same, or can differ. Also, the depth vision data 165 and the semantic vision data 161 can each be generated based on vision data from a single vision component, or can be generated based on vision data from different components. For example, depth vision data 165 generated based on data from a first sensor component and semantic vision data 161 generated based on data from a second sensor component.

The neural network model 150 also includes a language branch 170. The language branch 170 includes a memory network 172, an attention layer 176, and additional layer(s) 178. The memory network 172 can be, for example, a bi-directional memory network. The memory network 172 can be utilized to process natural language input 171 on a token-by-token basis to generate bi-directional memory network outputs 173. After processing the natural language input, the memory network 172 has one or more hidden states 174. For example, in the case of a bidirectional memory network 172, the hidden state(s) 174 can include a forward hidden state and a backward hidden state.

The hidden state(s) 174 and the semantic embedding 163 and the depth embedding 167 are utilized as a conditioning vector 175 for the attentional layer 176. For example, they can be concatenated and utilized as the conditioning vector 175. Accordingly, the bi-directional memory network outputs 173 are further processed, using the attention layer 176, and using the hidden state(s) 174 and the embeddings 163 and 167 as values for conditioning the attention. Processing the bi-directional network outputs 173 utilizing the attention layer 176 results in attention weighted outputs 177.

It is noted that, during a given episode of attempting performance of a task based on natural language input, the bi-directional memory network outputs 173 will stay the same and the hidden states 174 will stay the same. However, the attention weighted outputs 177 will change throughout the episode as new instances of semantic vision data 161 and depth vision data 165 are processed. This is due to the conditioning vector 175 including values that are based on the semantic embedding 163 and the depth embedding 167, which will change as new instances of semantic visions data 161 and depth vision data 165 are processed. Accordingly, the bi-directional memory network outputs 173 and the hidden states 174, which stay the same, can be re-utilized in subsequent iterations of an episode without having to be regenerated, conserving various resources. Utilization of the attention layer and the conditioning vector efficiently and effectively adapts the bi-directional memory network outputs to current vision data and/or other sensor data.

The attention weighted outputs 177 are optionally further processed utilizing one or more additional layers 178 (e.g., feedforward layers) of the language branch 170, to generate natural language embedding 179.

At each step during an episode, action prediction layer(s) 180 process the current semantic embedding 163, the current depth embedding 167, and the current natural language embedding to generate an action prediction output 181. The action prediction output 181 can indicate a motion primitive for a robot, and the robot can be controlled to implement the motion primitive. For example, the action prediction output at a step can be a corresponding probability for each of a plurality of motion primitives, and the highest probability motion primitive can be implemented at the step. Motion primitives can include, for example, "move forward", "move backward", "turn right", "turn left", "move up", "move down", and/or other motion primitive(s) (including more or less granular motion primitives).

One example robot 100 is illustrated in FIG. 1. Robot 100 is one example robot that can incorporate the neural network model 150 (e.g., in memory) and that can include processor(s) for processing data using the neural network model 150 to generate action(s) for controlling the robot 100 based on natural language input and vision data (and/or other sensor data). Robot 400 (FIG. 4, described below) is yet another example robot that can incorporate the neural network model 150 and that can include processor(s) for processing data using the neural network model 150

The robot 100 includes robot arm 105 with a grasping end effector 106, that takes the form of a gripper with two opposing actuable members. The robot 100 also includes a base 109 with wheels 107A and 107B provided on opposed sides thereof for locomotion of the robot 100. The base 109 may include, for example, one or more motors for driving corresponding wheels 107A and 107B to achieve a desired direction, velocity, and/or acceleration of movement for the robot 100.

The robot 100 also includes a vision component 108. The vision component 108A includes one or more vision sensors and may be, for example, a stereographic camera, a monographic camera, or a laser scanner. Vision data described herein can be generated based on output from vision sensor(s) of the vision component 108 and/or from other vision component(s) (not illustrated).

As described herein, robot 100 can operate autonomously at least part of the time and control actuators thereof in performance of various actions. For example, in performing various actions, one or more processors of the robot 100 can provide control commands to actuators associated with the wheels 107A and/or 107B, the robot arm 105 and/or the end effector 106. Further, in various situations the control commands provided at a given instance can be generated based at least in part on an action determined utilizing neural network model (e.g., an action to achieve a motion primitive) as described herein.

Figure 3:
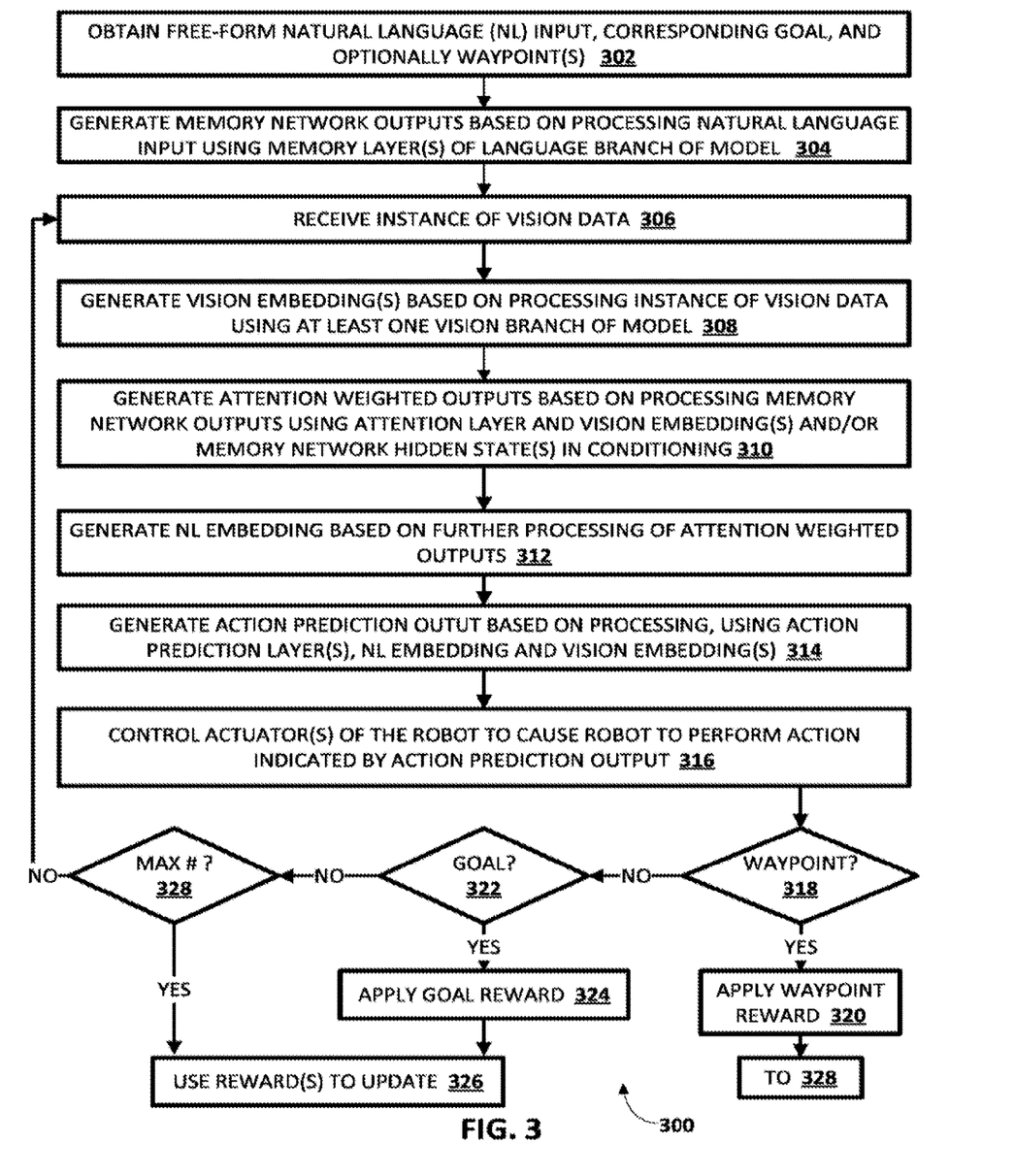
FIG. 3 is an example method of training a neural network model for utilization in control of a robot based on natural language input of a user and based on vision data.

Also illustrated in FIG. 1 is a training engine 115 that can utilize deep Q learning in training one or more portions of the neural network model 150 as described herein (e.g., in FIG. 3). In some implementations, in performing some or all of the training, the training engine 115 can utilize a simulator 117 that simulates various environments and a robotic agent acting within the various environments. The training engine 115 can operate a virtual agent, using the simulator 117, in exploring various environments utilizing the neural network model 150 and natural language input, and in updating the neural network model based on rewards determined based on output from the simulator 117.

Simulator 117 can be implemented by one or more computer systems and is used to simulate an environment that includes corresponding environmental object(s), and to simulate a robot operating in the simulated environment. Various simulators can be utilized, such as physics engines that simulates collision detection, soft and rigid body dynamics, etc. One non-limiting example of such a simulator is the BULLET physics engine.

In operating in a simulated environment during training of the neural network model 150, the simulator 115 can utilize various natural language inputs, such as natural language inputs that are human generated and/or automatically generated based on room labels in the simulated environment and/or object labels in the simulated environment. Further, during an episode of navigating the simulated robot in the simulated environment based on corresponding natural language input, a reward can be generated (or not) based on a goal that corresponds to the natural language input, and optionally based on waypoint(s) toward the goal. For example, assume the natural language input of "Exit the room, turn left and walk through the hall and enter the doorway in front of you". For such input, a reward of +1.0 can be generated responsive to the simulated robotic agent "entering the doorway in front of you", and optionally intermediate reward(s) can be generated for one or more waypoints such as "the hall". Further, during the episode, simulated vision data can be generated, from the view of the simulated robotic agent, and utilized in generating instances of semantic vision data and/or depth data. Alternatively, the semantic vision data and/or the depth data can be generated directly (e.g., using ground truth values available directly from the simulator 117).

Figure 2:
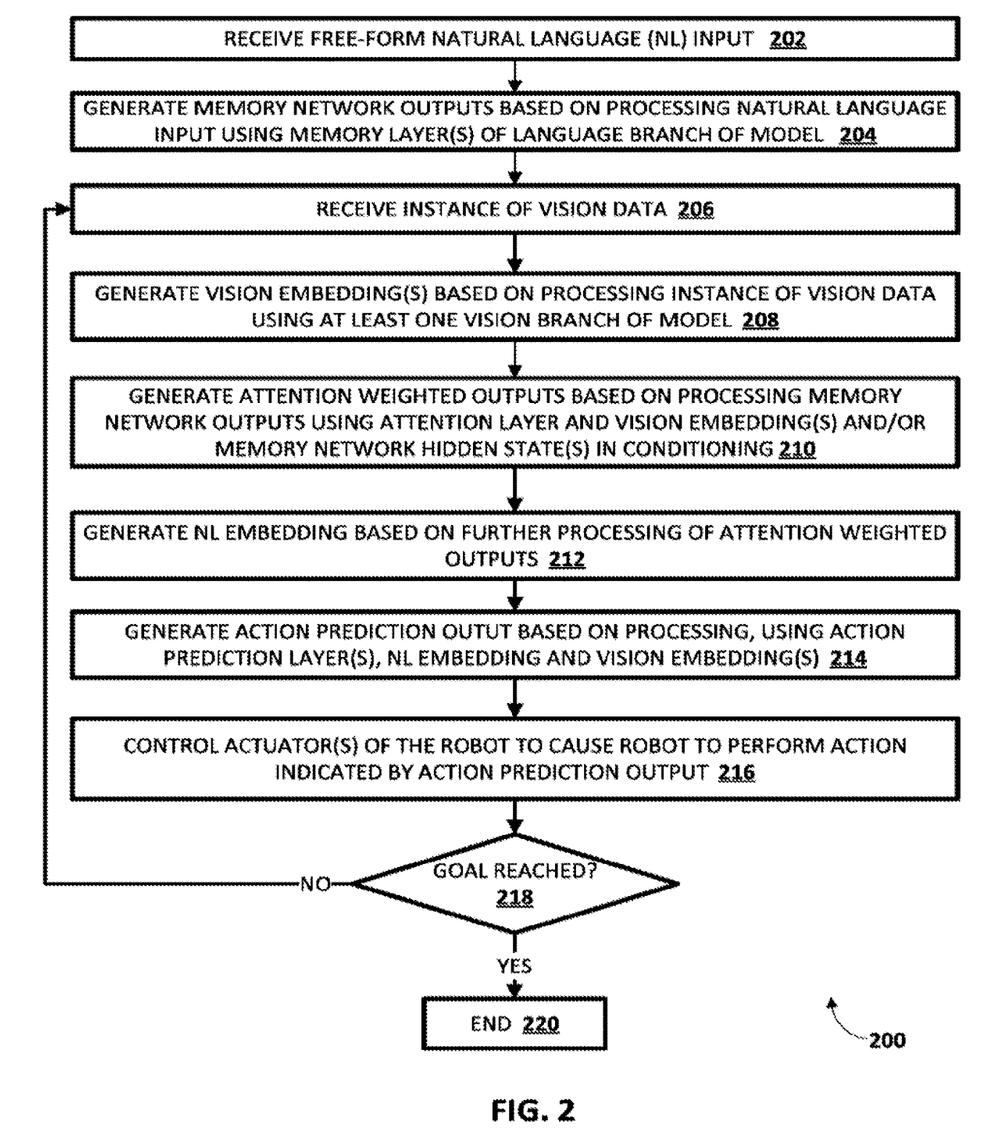
FIG. 2 is an example method of controlling a robot based on a natural language input of a user and based on vision data from vision component(s) of the robot.

FIG. 2 is an example method 200 of controlling a robot based on a natural language input of a user and based on vision data from vision component(s) of the robot. For convenience, some of the operations of the method 200 are described with reference to a system that performs the operations. This system may include various components of a robot, such as one or more processors of robot 100 (FIG.

Figure 4:
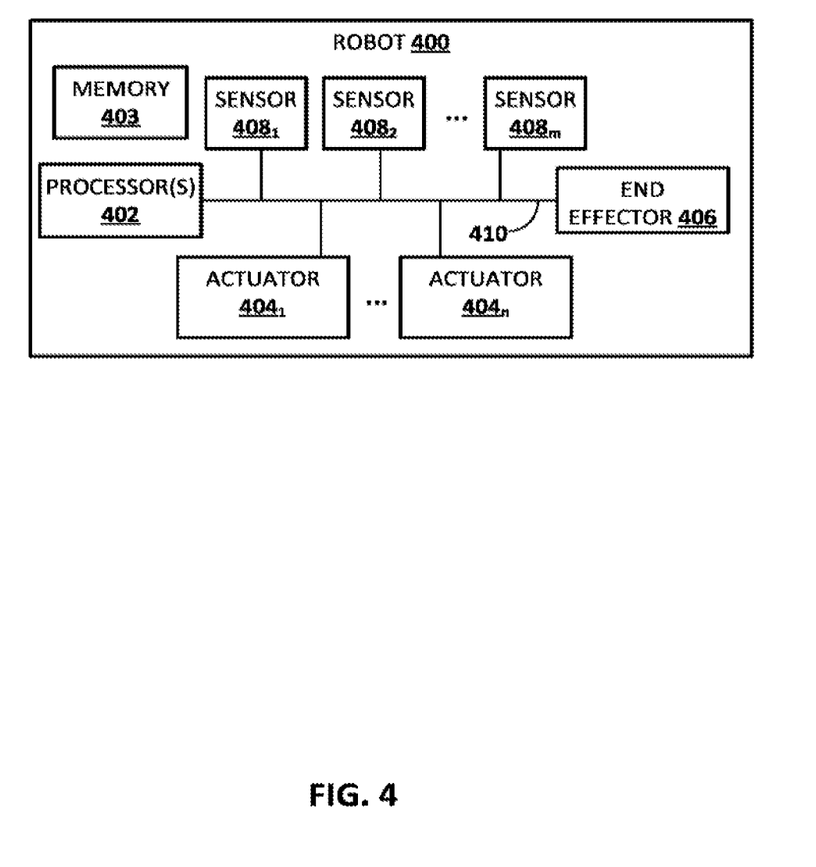
FIG. 4 illustrates an example architecture of a robot.

1) and/or robot 400 (FIG. 4). Moreover, while operations of the method 200 are shown in a particular order, this is not meant to be limiting. One or more operations may be performed in parallel, reordered, omitted, or added.

At block 202, the system receives free-form natural language (NL) input. For example the free-form natural language input can be text that has been converted, using speech-to-text processing, from audio data capturing a spoken command of the user. As one example, the command can be "go through the door, turn left, go to the end of the hallway, then go through the door on the right."

At block 204, the system generates memory network outputs based on processing the natural language input using memory layer(s) of a language branch of a model (e.g., a neural network model). The memory layer(s) can be, for example, bi-directional memory layers.

At block 206, the system receives an instance of vision data. For example, the instance of vision data can include an instance of semantic vision data, as well as an instance of depth vision data.

At block 208, the system generates vision embedding(s) based on processing of the instance of vision data using at least one vision branch of the model. For example, the system can generate a semantic embedding based on processing the semantic vision data using a semantic vision branch, and can generate a depth embedding model based on processing the depth data using a depth vision branch.

At block 210, the system generates attention weighted outputs based on processing the memory network outputs using an attention layer, and using vision embedding(s) and/or memory network hidden state(s) in the conditioning. For example, the system can generate a conditioning vector that is a concatenation (or other combination) of the vision embedding(s) and of hidden state(s) of the memory network (e.g., forward and/or backward hidden states).

At block 212, the system generates an NL embedding based on further processing of the attention weighted outputs. For example, the attention weighted outputs can be processed using additional feed-forward layer(s) of the model, to generate the NL embedding.

At block 214, the system generates an action prediction output based on processing, using action prediction layer(s) of the model, the NL embedding and the vision embedding(s). In some implementations the action prediction output indicates which, of multiple motion primitives, should be implemented.

At block 216, the system controls actuator(s) of the robot to cause the robot to perform the action indicated by the action prediction output. For example, the system can control the actuator(s) to control the motion primitive indicated by the action prediction output.

At block 218, the system determines whether the goal (indicated by the action prediction output) has been reached or if other condition(s) have not been met (e.g., a maximum quantity of iterations has not yet been performed). The system can optionally determine the goal has been reached based on a most recent iteration indicating no action(s) should be taken (in which case block 216 would be skipped in that iteration). If not, the system proceeds back to block 206, receives another instance of vision data (captured after block 216), then performs another iteration of blocks 208, 210, 212, 214, and 216 based on the additional instance of vision data.

If, at block 218, the system determines the goal has been reached, or if other condition(s) have been met, the system proceeds to block 220 and the method 200 ends.

FIG. 3 is an example method of training a neural network model for utilization in control of a robot based on natural language input of a user and based on vision data. For convenience, some of the operations of the method 300 are described with reference to a system that performs the operations. This system may include various components, such as one or more processors of a computer system. Moreover, while operations of the method 300 are shown in a particular order, this is not meant to be limiting. One or more operations may be performed in parallel, reordered, omitted, or added.

At block 302, the system obtains free-form natural language (NL) input, a corresponding goal, and, optionally, waypoint(s) to encounter in reaching the goal. For example the free-form NL input can be manually or automatically generated, based on labels of a corresponding environment to be interacted with, and in view of the NL input being human-interpretable instructions for performing the goal. As one example: the NL input can be "go through the door, turn left, go to the end of the hallway, then go through the door on the right"; the goal can be "going through the door on the right"; and the waypoint(s) can include the "hallway" and/or other waypoint(s).

At block 304, the system generates memory network outputs based on processing the natural language input using memory layer(s) of a language branch of a model (e.g., a neural network model). The memory layer(s) can be, for example, bi-directional memory layers.

At block 306, the system receives an instance of vision data. For example, the instance of vision data can include an instance of semantic vision data, as well as an instance of depth vision data. In various implementations the instance of vision data is based on data from a simulator utilized during training.

At block 308, the system generates vision embedding(s) based on processing of the instance of vision data using at least one vision branch of the model. For example, the system can generate a semantic embedding based on processing the semantic vision data using a semantic vision branch, and can generate a depth embedding model based on processing the depth data using a depth vision branch.

At block 310, the system generates attention weighted outputs based on processing the memory network outputs using an attention layer, and using vision embedding(s) and/or memory network hidden state(s) in the conditioning. For example, the system can generate a conditioning vector that is a concatenation (or other combination) of the vision embedding(s) and of hidden state(s) of the memory network (e.g., forward and/or backward hidden states).

At block 312, the system generates an NL embedding based on further processing of the attention weighted outputs. For example, the attention weighted outputs can be processed using additional feed-forward layer(s) of the model, to generate the NL embedding.

At block 314, the system generates an action prediction output based on processing, using action prediction layer(s) of the model, the NL embedding and the vision embedding(s). In some implementations the action prediction output indicates which, of multiple motion primitives, should be implemented.

At block 316, the system determines whether a waypoint has been reached. If so, the system proceeds to block 320 and applies a waypoint reward, then proceeds to block 328. If not, the system proceeds to block 322.

At block 322, the system determines whether the goal has been reached. If so, the system proceeds to block 324 and applies a goal reward, then proceeds to block 326. If not, the system proceeds to block 328.

At block 328, the system determines whether a maximum quantity of attempts has been performed in the current episode. If not, the system proceeds back to block 306, receives another instance of vision data, then performs another iteration of blocks 308, 310, 312, and 314 based on the additional instance of vision data.

If block 326 is reached (via 322 or 328), then the system uses the applied reward(s) for the episode in updating the model. For example, the system can update the action prediction layer(s) and/or the attention layer(s) based on the reward(s). Optionally, other layer(s) may not be updated (i.e., remain fixed), such as the memory network layer(s) and/or the vision branch(es).

After block 326 is reached, the system can proceed back to block 302 and perform another iteration of method 300. Through multiple iterations of method 300 (optionally in parallel), exploration can take place and the model can be iteratively updated. Once sufficient training of the model has been completed, the model can be deployed on one or more real physical robots for further training and/or for use. Sufficient training can be determined based on, for example, a quantity of training iterations, simulated and/or real testing of the trained model, and/or other criterion/criteria.

FIG. 4 illustrates an example architecture of a robot 400. Robot 400 is another example of a robot that can be controlled according to techniques disclosed herein. Robot 400 can take various forms, including but not limited to a telepresence robot, a humanoid robot, an animal robot, an insect robot, an aquatic robot, a wheeled robot, a submersible robot, an unmanned aerial vehicle ("UAV") robot, and so forth. In various implementations, the robot 400 may include one or more processors 402 that can implement all and/or aspects of various methods disclosed herein. Processor(s) 402 of a robot may take various forms, such as one or more CPUs, one or more GPUs, one or more field-programmable gate arrays ("FPGA"), and/or one or more application-specific integrated circuits ("ASIC"). In some implementations, the processor(s) 402 may be operably coupled with memory 403. Memory 403 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, processor(s) 402 of a robot may be operably coupled with one or more actuators $404_{1-N}$, at least one end effector 406, and/or one or more sensors $408_{1-M}$, e.g., via one or more buses. The robot 400 may have multiple degrees of freedom and each of the actuators $404_{1-N}$ may control actuation of the robot 400 within one or more of the degrees of freedom responsive to control commands. The control commands are generated by one or more of the processor(s) 402 and provided to the actuators $404_{1-N}$ (e.g., via one or more of the buses) to control the robot 400. As described herein, various control commands can be generated based on the action prediction outputs generated using the neural network model. As used herein, "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

As used herein, "end effector" may refer to a variety of tools that may be operated by a robot in accomplishing various tasks. For example, some robots may be equipped with an end effector that takes the form of a claw with two opposing "fingers" or "digits." Such a claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth.

Sensors $4084_{1-M}$ of a robot may take various forms, including but not limited to vision components (e.g., laser scanners, stereographic cameras, monographic cameras), force sensors, pressure sensors, pressure wave sensors (e.g., microphones), proximity sensors (also referred to as "distance sensors"), torque sensors, bar code readers, radio frequency identification ("RFID") readers, accelerometers, gyroscopes, compasses, position sensors (e.g., odometer, a global positioning system), speedometers, edge detectors, and so forth. Some sensors of a robot can be integral with the robot (e.g., fixedly or removably coupled thereto). Some other sensors of a robot can optionally be located external to, but in direct or indirect communication with, a robot.

A vision component of a robot can include one or more vision sensors and may be, for example, a stereographic camera, a monographic camera, or a laser scanner. Vision data described herein can be generated based on output from vision sensor(s) of the vision component. For example, the output can be raw output from the vision sensor(s), or processed output. In some implementations, a stereographic camera includes two or more sensors (e.g., charge-coupled devices (CCDs)), each at a different vantage point. Vision data can be generated based on sensor data generated by the two sensors at a given instance, such as vision data that is a two-and-a-half-dimensional ("2.5D") (2D with depth) image, where each of the pixels of the 2.5D image defines an X, Y, and Z coordinate of a surface of a corresponding object, and optionally color values (e.g., R, G, B values) and/or other parameters for that coordinate of the surface. In some other implementations, a stereographic camera may include only a single sensor and one or more mirrors utilized to effectively capture sensor data from two different vantage points. A monographic camera can include a single sensor and captures two-dimensional ("2D") vision data. A laser scanner includes one or more lasers that emit light and one or more sensors that generate vision sensor data related to reflections of the emitted light. The vision data generated based on sensor output from a laser scanner may be, for example, 2.5D point cloud data. A laser scanner may be, for example, a time-of-flight laser scanner or a triangulation based laser scanner and may include a position sensitive detector (PSD) or other optical position sensor. In some implementations the laser scanner can be a LIDAR component.

While some or all aspects of methods disclosed herein can be performed by one or more processors of a robot, some or all aspects can optionally be performed by one or more computing devices that are separate from a robot. A computing device typically includes at least one processor which communicates with a number of peripheral devices via a bus subsystem. These peripheral devices may include a storage subsystem, including, for example, a memory subsystem and a file storage subsystem, user interface output devices, user interface input devices, and a network interface subsystem. The input and output devices allow user interaction with computing device. A network interface subsystem provides an interface to outside components (e.g., a robot) directly or indirectly (e.g., via one or more networks).

User interface input devices may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device, a robot, or onto a communication network. User interface output devices may include a display subsystem, a printer, or non-visual displays such as audio output devices. The display subsystem may include a flat-panel device, a projection device, or some other mechanism for creating a visible image. In general, use of the term "output device" is intended to include all possible types of devices and ways to output information from computing device to the user or to another machine or computing device.

Storage subsystem stores programming and data constructs that provide the functionality of some or all of the modules described herein. For example, the storage subsystem may include the logic to perform selected aspects of the methods described herein. Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a CD-ROM drive, an optical drive, or removable media cartridges. The modules implementing the functionality of certain implementations may be stored by file storage subsystem in the storage subsystem, or in other machines accessible by the processor(s). Bus subsystem provides a mechanism for letting the various components and subsystems of computing device communicate with each other as intended. A computing device can be of varying types including a workstation, server, computing cluster, blade server, server farm, etc.

We claim:

1. A method implemented by one or more processors, the method comprising:
generating semantic vision data, wherein generating the semantic vision data is based on processing instances of robot vision data using one or more neural networks,
wherein the robot vision data is generated based on output from a vision component of a robot, and
wherein the semantic vision data includes natural language labels of objects captured in at least some of the instances of robot vision data, and
receiving free-form natural language input, the free-form natural language input generated based on user interface input provided by a user via one or more user interface input devices;
generating, based on processing of both the natural language labels of the objects and the free-form natural language input using an additional neural network, action prediction output that indicates a robotic action to be performed; and
controlling one or more actuators of the robot based on the action prediction output, wherein controlling the one or more actuators of the robot causes the robot to perform the robotic action indicated by the action prediction output.

2. The method of claim 1, wherein generating the action prediction output further comprises processing additional vision data using the additional neural network and along with processing of the natural language labels of the objects and the free-form natural language input.

3. The method of claim 2, wherein the additional vision data is from an additional vision sensor of an additional vision component of the robot.

4. The method of claim 3, wherein the additional vision component is a light detection and ranging component and the vision component is a stereographic camera.

5. The method of claim 1, wherein the natural language labels of the objects are directly human interpretable.

6. The method of claim 5, wherein the free-form natural language input is generated based on a spoken utterance provided by the user and wherein the one or more user interface input devices include a microphone of the robot.

7. The method of claim 1, wherein the additional neural network comprises one or more attention layers.

8. The method of claim 1, wherein the action prediction output indicates one or more motion primitives for the robot.

9. The method of claim 1, wherein the free-form natural language input is generated based on a spoken utterance provided by the user and wherein the one or more user interface input devices include a microphone of the robot.

10. A robot comprising:
a vision component;
actuators;
memory storing instructions;
one or more processors operable to execute the instructions to:
generate semantic vision data based on processing instances of robot vision data using one or more neural networks,
wherein the robot vision data is generated based on output from the vision component, and
wherein the semantic vision data includes natural language labels of objects captured in at least some of the instances of robot vision data, and
receive free-form natural language input, the free-form natural language input generated based on user interface input provided by a user via one or more user interface input devices;
generate, based on processing of both the natural language labels of the objects and the free-form natural language input using an additional neural network, action prediction output that indicates a robotic action to be performed; and
control one or more of the actuators, based on the action prediction output, to cause the robot to perform the robotic action indicated by the action prediction output.

11. The robot of claim 10, wherein in generating the action prediction output one or more of the processors are further to process additional vision data using the additional neural network and along with processing of the natural language labels of the objects and the free-form natural language input.

12. The robot of claim 11, wherein the additional vision data is from an additional vision sensor of an additional vision component of the robot.

13. The robot of claim 12, wherein the additional vision component is a light detection and ranging component and the vision component is a stereographic camera.

14. The robot of claim 10, wherein the natural language labels of the objects are directly human interpretable.

15. The robot of claim 14, wherein the additional neural network comprises one or more attention layers.

16. The robot of claim 15, wherein the free-form natural language input is generated based on a spoken utterance provided by the user and wherein the one or more user interface input devices include a microphone of the robot.

17. The robot of claim 10, wherein the additional neural network comprises one or more attention layers.

18. The robot of claim 10, wherein the action prediction output indicates one or more motion primitives for the robot.

19. The robot of claim 10, wherein the free-form natural language input is generated based on a spoken utterance provided by the user and wherein the one or more user interface input devices include a microphone of the robot.

* * * * *